United States Patent
Yun et al.

(10) Patent No.: US 9,946,640 B2
(45) Date of Patent: Apr. 17, 2018

(54) METHOD AND APPARATUS FOR SECURING SUFFICIENT MEMORY IN A DEVICE

(71) Applicant: Samsung Electronics Co., Ltd., Suwon-si, Gyeonggi-do (KR)

(72) Inventors: Chang-sik Yun, Anyang-si (KR); Tae-hyung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 14/656,019

(22) Filed: Mar. 12, 2015

(65) Prior Publication Data

US 2015/0269068 A1    Sep. 24, 2015

(30) Foreign Application Priority Data

Mar. 18, 2014  (KR) .................. 10-2014-0031824

(51) Int. Cl.
*G06F 12/00* (2006.01)
*G06F 12/02* (2006.01)
*G06F 3/06* (2006.01)

(52) U.S. Cl.
CPC .............. *G06F 12/023* (2013.01); *G06F 3/06* (2013.01); *G06F 2212/1044* (2013.01)

(58) Field of Classification Search
CPC . G06F 2212/1044; G06F 12/06; G06F 12/023
See application file for complete search history.

(56) References Cited

U.S. PATENT DOCUMENTS

| | | | |
|---|---|---|---|
| 8,434,092 B2 | 4/2013 | Miner et al. | |
| 2002/0046204 A1* | 4/2002 | Hayes | G06F 11/3409 |
| 2008/0268828 A1* | 10/2008 | Nagaraja | G06F 9/505 |
| | | | 455/419 |
| 2009/0240924 A1* | 9/2009 | Yasaki | G06F 9/45558 |
| | | | 712/220 |
| 2010/0317371 A1* | 12/2010 | Westerinen | H04M 1/72566 |
| | | | 455/456.6 |
| 2012/0023236 A1* | 1/2012 | Backholm | H04L 47/20 |
| | | | 709/226 |
| 2015/0095521 A1* | 4/2015 | Hackborn | G06F 3/0608 |
| | | | 710/18 |

\* cited by examiner

*Primary Examiner* — Larry T Mackall
(74) *Attorney, Agent, or Firm* — Jefferson IP Law, LLP

(57) ABSTRACT

A method of managing a memory of a device is provided. The method includes acquiring amount of memory use information of the device, estimating a memory use pattern, based on the amount of memory use information of the device, and acquiring an amount of memory of the device, based on the estimated memory use pattern.

33 Claims, 12 Drawing Sheets

FIG. 4

| KIND | INFORMATION TYPE | OPERATION | HISTORY |
|---|---|---|---|
| APPLICATION 1 | COOPERATION | CAMERA BUTTON CLICK | APPLICATION 2 → 401 |
| APPLICATION 1 | MEMORY | CAMERA BUTTON CLICK | 400MB → 403 |
| APPLICATION 1 | MEMORY | ALBUM BUTTON CLICK | 450MB → 405 |
| APPLICATION 2 | MEMORY | EXECUTION START | 250MB |
| APPLICATION 2 | MEMORY | SLIDE SHOW START | 200MB |

41 — KIND
42 — INFORMATION TYPE
43 — OPERATION
44 — HISTORY
40

FIG. 5

| REFERENCE | CONTENT | USE APPLICATION | AMOUNT OF MEMORY USE | |
|---|---|---|---|---|
| TIME | 07:00 | APPLICATION 2, APPLICATION 3 | 250MB | ← 501 |
| PLACE | A SUBWAY STATION | APPLICATION 4 | 400MB | ← 502 |
| TIME | 18:00 | APPLICATION 5 | 450MB | ← 503 |
| USER | FIRST USER | APPLICATION 6 | 250MB | |
| MODE | SLEEP MODE | APPLICATION 7 | 100MB | ← 504 |
| USER | SECOND USER | APPLICATION 2, APPLICATION 3 | 200MB | |
| MODE | NAVIGATION MODE | APPLICATION 7 | 500MB | |

METHOD AND APPARATUS FOR SECURING SUFFICIENT MEMORY IN A DEVICE

CROSS-REFERENCE TO RELATED APPLICATION(S)

This application claims the benefit under 35 U.S.C. § 119(a) of a Korean patent application filed on Mar. 18, 2014 in the Korean Intellectual Property Office and assigned Serial number 10-2014-0031824, the entire disclosure of which is hereby incorporated by reference.

TECHNICAL FIELD

The present disclosure relates to a method and an apparatus for managing a memory in a device. More particularly, the present disclosure relates to a method and an apparatus for securing sufficient memory in a device.

BACKGROUND

Generally, when a device receives an input about an operation of an application from a user, the device determines an amount of memory use of the device by the application which is executed on the device and allocates memory for the operation of the application. However, when an amount of available memory is insufficient, the device terminates an application which is currently loaded or cached in a memory and allocates additional memory for an operation of the application.

However, a device spends an additional time terminating the application which is currently loaded or cached in a memory, and thus, a user of the device wastes an additional time after requesting an operation of the application. As a result, the user is inconvenienced by experiencing screen disconnection, buffering, sluggishness, and the like.

Moreover, various methods of managing a memory of a device are being developed. However, a memory is uniformly managed regardless of a characteristic of each user. As a result, an application, which the user does not desire to terminate, is terminated, or an operation, which the user does not intend to perform, is performed.

Therefore, a need exists for a method and an apparatus for managing a memory of a device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for managing a memory of a device.

In accordance with an aspect of the present disclosure, a method of managing a memory of a device is provided. The method includes acquiring amount of memory use information of the device, estimating a memory use pattern, based on the amount of memory use information of the device, and acquiring an amount of memory of the device, based on the estimated memory use pattern.

The acquiring of the amount of memory use information may include acquiring working memory information of an application which operates in the device and acquiring the amount of memory use information of the device, based on the working memory information of the application.

The estimating of the memory use pattern may include estimating an operation pattern of the application, estimating the memory use pattern, based on the operation pattern of the application and the working memory information of the application, and determining an average memory use of the application, based on the estimated memory use pattern.

The acquiring of the amount of memory may include receiving an operation request for the application and acquiring the amount of memory of the device, based on the average memory use of the application.

The estimating of the memory use pattern may include acquiring time information, and estimating a time-based memory use pattern, based on the time information and the acquired amount of memory use information.

The acquiring of the amount of memory may include, when a certain time arrives, acquiring the amount of memory of the device, based on the time-based memory use pattern.

The estimating of the memory use pattern may include acquiring location information and estimating a location-based memory use pattern, based on the location information and the acquired amount of memory use information.

The acquiring of the amount of memory may include, when the device arrives at a certain point, acquiring the amount of memory of the device, based on the location-based memory use pattern.

The estimating of the memory use pattern may include acquiring mode information of the device and estimating a mode-based memory use pattern, based on the mode information and the acquired amount of memory use information.

The acquiring of the amount of memory may include, when the device is switched to a certain mode, acquiring the amount of memory of the device, based on the mode-based memory use pattern.

The estimating of the memory use pattern may include acquiring user information of the device and estimating a user-based memory use pattern, based on the user information and the acquired amount of memory use information.

The acquiring of the amount of memory may include, when a user of the device is changed, acquiring the amount of memory of the device, based on the user-based memory use pattern.

The method may further include storing the amount of memory use information of the device.

The method may further include transmitting, to a cloud server, at least one selected from information about the memory use pattern or the amount of memory use information of the device.

The acquiring of the amount of memory use information may include receiving the amount of memory use information of the device from a cloud server.

The acquiring of the working memory information may include acquiring information of another application cooperating with the application.

The acquiring of the amount of memory may include receiving an operation request for the application and terminating other applications except for the cooperated application according to a priority, based on the information of the other application cooperating with the application.

In accordance with another aspect of the present disclosure, a device including a memory management apparatus is provided. The memory management apparatus includes a memory use acquisition unit configured to acquire a memory use information of a device, a memory pattern estimator configured to estimate a memory use pattern, based on the amount of memory use information of the device, and a memory controller configured to acquire an amount of memory of the device, based on the estimated memory use pattern.

The memory use acquisition unit may acquire the amount of memory use information of the device, based on working memory information of an application which operates in the device.

The memory pattern estimator may estimate an operation pattern of the application, estimate the memory use pattern, based on the operation pattern of the application and the working memory information of the application, and determine an average memory use of the application, based on the estimated memory use pattern.

The device may further include an application manager, wherein, the application manager may receive an operation request for the application, and the memory controller may acquire the amount of memory amount of the device, based on the average memory use of the application.

The memory pattern estimator may acquire time information and estimates a time-based memory use pattern, based on the time information and the acquired amount of memory use information.

When a certain time arrives, the memory controller may acquire the amount of memory of the device, based on the time-based memory use pattern.

The memory pattern estimator may acquire location information and estimate a location-based memory use pattern, based on the location information and the acquired amount of memory use information.

When the device arrives at a certain point, the memory controller may acquire the amount of memory of the device, based on the location-based memory use pattern.

The memory pattern estimator may acquire mode information of the device and estimate a mode-based memory use pattern, based on the mode information and the acquired amount of memory use information.

When the device is switched to a certain mode, the memory controller may acquire the amount of memory of the device, based on the mode-based memory use pattern.

The memory pattern estimator may acquire user information of the device and estimate a user-based memory use pattern, based on the user information and the acquired amount of memory use information.

When a user of the device is changed, the memory controller may acquire the amount of memory of the device, based on the user-based memory use pattern.

The device may further include a storage unit that stores the amount of memory use information of the device.

The device may further include a communication unit that transmits, to a cloud server, at least one selected from information about the memory use pattern or the amount of memory use information of the device.

The device may further include a communication unit, wherein the memory use acquisition unit may receive the amount of memory use information of the device from a cloud server through the communication unit.

The memory use acquisition unit may acquire information of another application cooperating with the application.

The device may further include an application manager, wherein, the application manager may receive an operation request for the application, and the memory controller may terminate other applications except for the cooperated application according to a priority, based on the information of the other application cooperating with the application.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a diagram illustrating working memory information of an application according to an embodiment of the present disclosure;

FIG. 5 is a flowchart illustrating a memory use pattern according to an embodiment of the present disclosure;

Throughout the drawings, it should be noted that like reference numbers are used to depict the same or similar elements, features, and structures.

DETAILED DESCRIPTION

Figure 1:
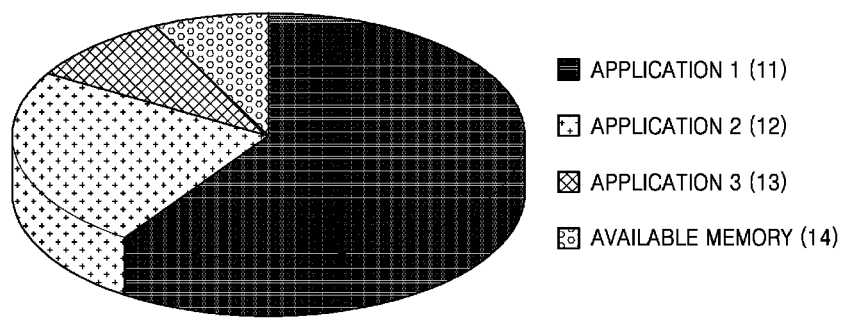
FIG. 1 is a diagram illustrating an amount of memory use of a device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Terms used in the present disclosure have been selected as general terms which are widely used at the present time, based on the functions of the present disclosure, but may be altered according to the intent of an operator of ordinary skill in the art, practice according to the related art, or introduction of new technology. In addition, if there is a term which is arbitrarily selected by the applicant in a specific case, in which case a meaning of the term will be described in a corresponding description portion of the present disclosure. Therefore, the terms should be defined based on the entire content of the embodiments of the present disclosure instead of a simple name of each of the terms.

In embodiments of the present disclosure, when it is described that one comprises (or includes or has) some elements, it should be understood that it may comprise (or include or has) only those elements, or it may comprise (or include or have) other elements as well as those elements if there is no specific limitation. Moreover, each of terms, such as " . . . unit", " . . . apparatus" and "module" described in the specification denotes an element for performing at least one function or operation, and may be implemented in hardware, software, or a combination of hardware and software.

In embodiments of the present disclosure, examples of a device may include devices, such as a personal computer (PC), a cellular phone, a smartphone, a television (TV), a tablet PC, a laptop computer, a personal digital assistant (PDA), a portable multimedia player (PMP), a navigation, a Motion Pictures Expert Group (MPEG-1 or MPEG-2) Audio Layer 3 (MP3) player, and a digital camera, and include various devices without being limited to the examples.

Moreover, examples of a memory used herein may include all kinds of memories, such as a random access memory (RAM), a flash memory, and the like, which act as a main memory or an auxiliary memory built into a device. In addition, a memory used herein is a memory that is a resource managed by a device and may denote a memory or a system memory that is allocated depending on an operation of an application.

An application used herein includes an application and a program, and may include a process which performs an operation of the application and components which are included in the application. For example, an application used herein may include all elements which operate in a device.

An operation of an application used herein includes execution of the application, and may denote all operations, which are performed by the application, such as screen conversion, sound reproduction, data communication, and the like.

Additionally, an amount of memory used herein may include a size of a memory space and a memory capacity.

Various embodiments of the present disclosure capable of being easily embodied by those of ordinary skill in the art will now be described with reference to the accompanying drawings. The present disclosure may, however, be embodied in many different forms and should not be construed as being limited to the embodiments set forth herein. In the accompanying drawings, a portion irrelevant to a description of the present disclosure will be omitted for clarity.

Hereinafter, various embodiments of the present disclosure will be described.

FIG. 1 is a diagram illustrating an amount of memory use of a device according to an embodiment of the present disclosure.

Referring to FIG. 1, according to an embodiment of the present disclosure, the device may include a memory 10. According to an embodiment of the present disclosure, the memory 10 may include a system memory.

According to an embodiment of the present disclosure, the device receives an application operation request of a user and allocates memory for an operation of an application. For example, according to an embodiment of the present disclosure, the device allocates memory or memory space, in which an application or a process for executing the application is loaded or cached, in a memory, such as a RAM, a flash memory, and the like. According to an embodiment of the present disclosure, loading of an application may include caching of an application.

According to an embodiment of the present disclosure, the device may determine an amount of memory use, determine whether an available memory of the device is sufficient to operate the application, and allocate a memory space based on the determined result.

For example, when the device receives, from a user, an operation request for an application which searches for files, the device may determine an amount of memory use and allocate a memory space used to operate the application which searches for the files.

FIG. 1 illustrates an amount of memory use of the memory 10 of the device. Referring to FIG. 1, an application 1 11, an application 2 12, and an application 3 13 are loaded in the memory 10 of the device. In addition, an available memory 14, in which an application is not loaded, exists in the memory 10.

According to an embodiment of the present disclosure, when the device receives an application operation request from the user, the device may determine an amount of memory use to determine how much memory is used for an operation of the application, and determine whether the available memory 14 equal to the amount of memory use for the operation of the application exists.

According to an embodiment of the present disclosure, when it is determined that the available memory 14 equal to or greater than the amount of memory used for the operation of the application exists, the device may load an application into the memory 10 so as to operate the application. However, when the available memory 14 is insufficient, the device may terminate at least one of the application 1 11, the application 2 12, and the application 3 13, which are previously loaded, thereby securing a memory space.

According to an embodiment of the present disclosure, a method of securing a memory space may be performed according to various algorithms. For example, the method may be performed by various schemes, such as a scheme in which an application which is last used among applications loaded in a memory is latest terminated, a scheme in which an application is terminated according to a priority set in a device, and a scheme in which all applications stored in a memory are terminated when an amount of memory use is equal to or greater than a certain level, but it is not limited thereto. A method of securing a memory space of a device is obvious to one of ordinary skill in the art, and thus, its detailed description thereof is not provided.

According to an embodiment of the present disclosure, an amount of memory use of a device may be changed depending on a pattern of a device user, and thus, by taking into account the pattern of the device user, a memory is more efficiently used.

Figure 2:
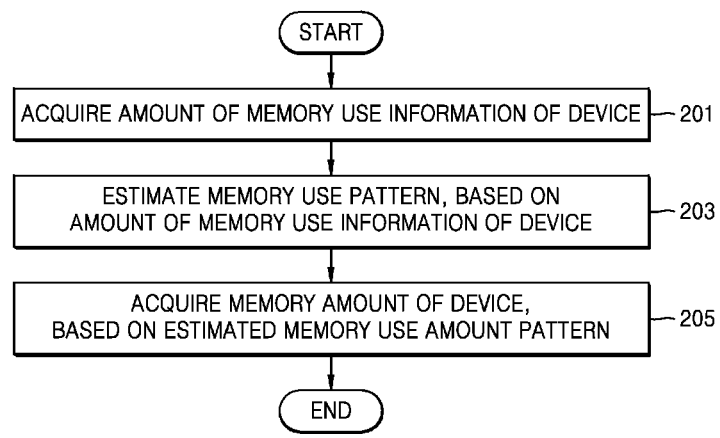
FIG. 2 is a diagram illustrating a method of managing a memory of a device according to an embodiment of the present disclosure.

FIG. 2 is a diagram illustrating a method of managing a memory of a device according to an embodiment of the present disclosure.

Referring to FIG. 2, in operation 201, a device may acquire amount of memory use information of the device. According to an embodiment of the present disclosure, the device determines an amount of memory use of the device, thereby acquiring the amount of memory use information.

According to an embodiment of the present disclosure, the amount of memory use information is information about an amount of memory used by the device and may include various information. For example, a total memory may include a currently used memory and a kind of an application which is currently loaded in a memory.

According to an embodiment of the present disclosure, the device may acquire working memory information of an application which operates in the device, and acquire an amount of memory use information of the device, based on the working memory information of the application.

According to an embodiment of the present disclosure, the working memory information of the application may denote an amount of memory used for each operation of the application. For example, an amount of memory, which is used to first execute the application, may denote each of an amount of memory used for an operation of reproducing sound of the application and an amount of memory used for a data streaming operation.

According to an embodiment of the present disclosure, the device may acquire the amount of memory use information, based on the working memory information of the application. For example, the device may summate pieces of application working memory information, which are amounts of memory used for operations of the application which is operating in the device, thereby acquiring the amount of memory use information.

Additionally, according to an embodiment of the present disclosure, the device may acquire the working memory information of the application, and moreover, acquire information of another application cooperating with the application. According to an embodiment of the present disclosure, a cooperation of an application may denote inter-processor communication, which is performed by an operation of the application.

As an example of a cooperation of an application, assuming that a first application is a messenger application, the first application may transmit data, such as a photograph, a music file, and the like. A second application associated with an album may be executed in order for the first application to transmit a photograph. In this case, the first application may cooperate with the second application.

According to an embodiment of the present disclosure, information of another application cooperating with an application may include an identifier of the other application cooperating with the application and information about a frequency number of cooperation of the application with the other application.

Additionally, according to an embodiment of the present disclosure, the device may receive amount of memory use information from a cloud server.

In operation 203, the device may estimate a memory use pattern, based on the amount of memory use information of the device.

According to an embodiment of the present disclosure, the device may pattern what amount of memory the device uses, thereby managing a memory of the device.

For example, in a case where the user uses an application which uses 200 MB of memory under a certain condition, if an amount of memory of 200 MB is secured before the certain condition, an abnormal operation or disconnection does not occur in an operation of the application. Therefore, the device may acquire amount of memory use information and estimate a memory use pattern of the device based on the acquired amount of memory use information, thereby securing a memory space of the device.

According to an embodiment of the present disclosure, the device may estimate an operation pattern of the application which operates in the device, and estimate a memory use pattern, based on the operation pattern of the application and the working memory information of the application. According to an embodiment of the present disclosure, the operation pattern of the application may denote information about which operations are performed by using the application.

According to an embodiment of the present disclosure, since the device manages the application which operates in the device, when the user uses the application, the device knows a function used by the user. For example, the device knows which operations are performed by using the application.

For example, the device may detect an operation of a first application which operates in the device, and acquire information in which the user of the device mainly uses a chatting function of the first application and a music streaming function of the first application by using the first application. Therefore, the device estimates an operation pattern of the first application. In addition, the device knows an amount of memory used for each operation, based on working memory information and thus estimates a memory use pattern.

Additionally, according to an embodiment of the present disclosure, the device may determine an average memory use of an application, based a memory use pattern.

According to an embodiment of the present disclosure, a memory used by an application may be continuously changed according to an operation of the application. However, when it is estimated that the application is likely to perform at least one operation, when memory is allocated by calculating an amount of memory for the at least one operation performed by the application, a possibility that memory is additionally allocated in each operation of the application is lowered. According to an embodiment of the present disclosure, an amount of memory obtained by summating memory amounts of operations included in an application operation pattern may be referred to as an average memory used by the application.

Moreover, according to an embodiment of the present disclosure, the device may estimate a time-based memory use pattern.

According to an embodiment of the present disclosure, the device may acquire time information and estimate the time-based memory use pattern, based on the acquired time information and amount of memory use information.

For example, the device may determine an amount of memory use of the device at 7 AM and determine the amount of memory use of the device at 10 AM, thereby estimating a time-based memory use pattern. In addition, the device may estimate the memory use pattern by determining how much memory is used daily or monthly.

Moreover, according to an embodiment of the present disclosure, the device may estimate a use pattern of an application based on a time, and estimate a memory use pattern, based on the estimated use pattern of the application and an application working memory. For example, by acquiring information about which application is used at a certain time, the device may estimate a use pattern of an application based on a time.

According to an embodiment of the present disclosure, a method of estimating a memory use pattern may use various methods. For example, the device may estimate a memory use pattern, based on a maximum amount of memory use and estimate the memory use pattern, based on an average memory use within a certain time. However, the present embodiment is not limited thereto. According to an embodiment of the present disclosure, the maximum amount of memory use may denote an amount of memory which is maximally used within a certain time.

According to an embodiment of the present disclosure, an amount of memory use determination period may be set according to a user input.

According to an embodiment of the present disclosure, the device may estimate a location-based memory use pattern.

According to an embodiment of the present disclosure, the device may acquire location information and estimate the location-based memory use pattern, based on the acquired location information and amount of memory use information.

According to an embodiment of the present disclosure, the location information may include information about a location of the device. In addition, according to an embodiment of the present disclosure, the location information may be received from a global positioning system (GPS) sensor of the device or a network.

For example, the device may determine an amount of memory use of the device at a subway station and determine the amount of memory use of the device at a certain location, such as the home or the company of the user, thereby estimating a location-based memory use pattern. In addition, the memory use pattern may be estimated by taking into account all the above-described time information and location information.

Moreover, according to an embodiment of the present disclosure, the device may estimate a use pattern of an application based on a location and estimate a memory use pattern, based on the estimated use pattern of the application and an application working memory.

For example, when the user of the device operates an alarm application, the device may estimate a use pattern in which the alarm application operates in a home, and estimate a memory use pattern, based on amount of memory information used for an operation of the alarm application.

Additionally, according to an embodiment of the present disclosure, the device may estimate a mode-based memory use pattern.

According to an embodiment of the present disclosure, the device may acquire mode information and estimate the mode-based memory use pattern, based on the acquired mode information and amount of memory use information. According to an embodiment of the present disclosure, the mode information may include a mode of the device and information about mode switching.

According to an embodiment of the present disclosure, the device may operate in various modes. For example, the device may operate in various modes, such as a sleep mode, a navigation mode, a movie watching mode, a game mode, and the like, but the present embodiment is not limited thereto. According to an embodiment of the present disclosure, the device may execute different applications in different modes.

For example, the device may determine an amount of memory use in the sleep mode and determine an amount of memory use in the navigation mode, thereby estimating a mode-based memory use pattern. The memory use pattern may be estimated by taking into account all the above-described time information, location information, and mode information.

Moreover, according to an embodiment of the present disclosure, the device may estimate a use pattern of an application, based on a mode, and estimate a memory use pattern, based on the estimated use pattern of the application and an application working memory.

For example, the device may determine that the device is in the sleep mode, based on mode information and determine a used application, such as the alarm application executed in the sleep mode or a sleep mode application, thereby estimating an application use pattern of the device in the sleep mode. The device may estimate a memory use pattern, based on the estimated application use pattern and working memory information of each operation included in the estimated application use pattern.

According to an embodiment of the present disclosure, the device may estimate a memory use pattern based on the user.

According to an embodiment of the present disclosure, a plurality of users may use one device. Therefore, patterns in which a memory of a device is used may differ for each user of the device.

According to an embodiment of the present disclosure, the device may acquire user information and estimate a user-based memory use pattern, based on the acquired use information and amount of memory use information.

According to an embodiment of the present disclosure, the user information may include information for identifying a user, login information, and authentication information, but is not limited thereto. The user information of the device may be received according to a user input or may be received from an external device, such as an authentication server, but is not limited thereto.

For example, a first user of a plurality of users of the device may mainly watch a movie by using the device, and a second user of the plurality of users of the device may draw a picture by using the device. Therefore, the device may determine an amount of memory use for each user, thereby estimating a user-based memory use pattern. The memory use pattern may be estimated by taking into account all the above-described time information, location information, mode information, and user information.

Moreover, according to an embodiment of the present disclosure, the device may estimate a use pattern of an application based on users and estimate a memory use pattern, based on the estimated use pattern of the application and an application working memory.

For example, the device may determine an application which is used by the first user and the second user for a certain time, and thus determine an application which is used by the first user and the second user a certain number of times or more. Therefore, the device estimates an application use pattern of each of the first and second users. The device may estimate the memory use pattern, based on the estimated application use pattern and working memory information of each application included in the estimated application use pattern.

In operation 205, the device may secure a memory space of the device, based on the estimated memory use pattern.

According to an embodiment of the present disclosure, a method of securing a memory space includes various methods and corresponds to details described above with reference to FIG. 1, and thus, its detailed description thereof is not provided.

According to an embodiment of the present disclosure, the device may determine an amount of memory which is to be secured, based on the estimated memory use pattern. In addition, the device may compare an available memory with the determined amount of memory which is to be secured.

According to an embodiment of the present disclosure, when the available memory is greater than the amount of memory to be secured as the comparison result, the device may not terminate applications loaded in a memory. However, when the amount of memory to be secured is greater than the available memory as the comparison result, the device may terminate at least one of the applications loaded in the memory.

According to an embodiment of the present disclosure, the device may receive an operation request for an application and secure a memory space of the device, based on an average memory use of the application.

For example, according to an embodiment of the present disclosure, when the device receives the operation request for the application, the device may secure a memory space for performing the received operation request, and moreover secure an amount of memory equal to the estimated average memory use of the application, based on working memory information of the application. Therefore, a possibility that the device does not additionally secure memory when another operation request for the application is received increases, and thus, a time used for an operation of the application is shortened.

For example, assuming that a memory of 100 MB is needed when a first application is executed and the user requests a first operation requiring a memory of 200 MB a certain number of times by using the first application, the device may estimate that the user is likely to execute the first operation after the first application is executed. Therefore, the device secures a memory of 300 MB when the first application is executed, and thus, when the first application performs the first operation, the device may not control a memory for securing an additional memory.

Additionally, according to an embodiment of the present disclosure, when a certain time arrives, the device may secure a memory space, based on a time-based memory use pattern.

For example, the device may estimate a memory use pattern using a memory of 300 MB at 10 PM, and thus, secure a memory of 300 MB before 10 PM. In addition, the device may estimate an application use pattern using an alarm application at 10 PM, and thus, secure a memory space used for an operation of the alarm application before 10 PM.

Moreover, according to an embodiment of the present disclosure, when the device reaches a certain point or is within a certain range from the certain point, the device may secure a memory space, based on a location-based memory use pattern.

For example, the device estimates a memory use pattern in which the user of the device uses 200 MB of memory at the user's company, and thus, when the device is located within a certain range from a time arriving at the company or from the company, the device may secure a memory of 200 MB. In addition, the device estimates an application use pattern using a card game application at a subway station, and thus, when the device is located within a certain range from the subway station, the device may secure a memory space used for an operation of the card game application.

According to an embodiment of the present disclosure, when a mode is switched, the device may secure a memory space, based on a mode-based memory use pattern.

For example, the device may estimate a memory use pattern using a memory of 100 MB in the sleep mode, and thus, when a mode is switched to the sleep mode, the device may secure a memory of 100 MB. In addition, the device may estimate an application use pattern using a sleep mode alarm application, and thus, when a mode is switched to the sleep mode, the device may secure a memory space used for an operation of the alarm application.

According to an embodiment of the present disclosure, when a user is changed, the device may secure a memory space, based on a user-based memory use pattern.

For example, the first user of the device may estimate a memory use pattern using a memory of 400 MB, and thus, when a user is changed to the first user, the device may estimate an application use pattern in which the first user uses an application for movie reproduction, and thus, when a user is changed to the first user, the device may secure a memory space used for an operation of the application for movie reproduction.

Additionally, according to an embodiment of the present disclosure, when the device receives an operation request for an application and secures a memory space, based on information of another application cooperating with the application, the device may terminate other applications except the cooperated application according to a certain priority. For example, even though another application cooperating with an application is terminated, a possibility of reoperation is high, and thus, an application cooperating with an application receiving an operation request may be last terminated.

According to an embodiment of the present disclosure, the device may store at least one selected from the group consisting of an amount of memory use, information about a memory use pattern, application working memory information, information about an application use pattern, and information about an average memory used by an application.

Moreover, according to an embodiment of the present disclosure, the device may transmit, to a cloud server, at least one selected from the group consisting of the amount of memory use, the information about the memory use pattern, the application working memory information, the information about the application use pattern, and the information about the average memory used by the application.

Moreover, the device may receive, from the cloud server, at least one selected from the group consisting of the amount of memory use, the information about the memory use pattern, the application working memory information, the information about the application use pattern, and the information about the average memory used by the application. For example, the cloud server may estimate a memory use pattern or an application use pattern based on each of a time, a user, a mode, and a location of the device, based on working memory information, and the device may receive the estimation result from the cloud server. Therefore, an arbitrary device connected to the cloud server may receive a stored estimation result, and thus manage a memory of the arbitrary device.

Figure 3:
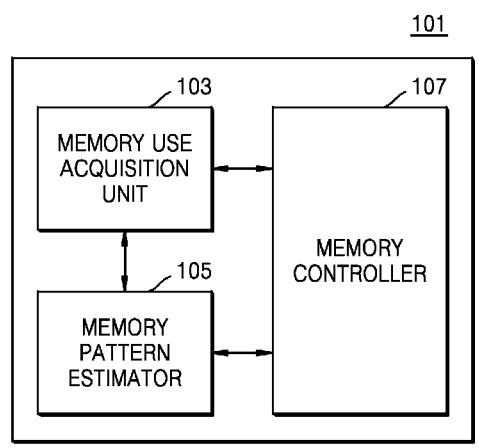
FIG. 3 is a block diagram illustrating a memory management apparatus according to an embodiment of the present disclosure.

FIG. 3 is a block diagram illustrating a memory management apparatus according to an embodiment of the present disclosure.

Referring to FIG. 3, according to an embodiment of the present disclosure, a memory management apparatus 101 may include a memory management apparatus included in a device. In addition, according to an embodiment of the present disclosure, the memory management apparatus 101 may be included in a controller (not shown), such as a processor of a device, and may include at least one processor.

According to an embodiment of the present disclosure, the memory management apparatus 101 may include a memory use acquisition unit 103, a memory pattern estimator 105, and a memory controller 107.

According to an embodiment of the present disclosure, the memory use acquisition unit 103 may acquire memory use information of the device, based on the amount of memory use information of the device.

Moreover, according to an embodiment of the present disclosure, the memory use acquisition unit 103 may acquire the amount of memory use information of the device, based on working memory information of an application which operates in the device. The working memory information of the application may include information about an amount of memory used for each operation of the application. According to an embodiment of the present disclosure, the device may summate pieces of working memory information of the application, which are pieces of memory information about respective operations of the application which are performed in the device, thereby acquiring the amount of memory use information of the device.

According to an embodiment of the present disclosure, the memory use acquisition unit 103 may receive the amount of memory use information of the device from the cloud server through a communication unit. In addition, according to an embodiment of the present disclosure, the memory use acquisition unit 103 may acquire information of another application cooperating with the application.

According to an embodiment of the present disclosure, the memory pattern estimator 105 may estimate a memory use pattern, based on the amount of memory use information of the device. According to an embodiment of the present disclosure, the memory use pattern may denote information about a certain type of using a memory, include all information about a memory use type based on a time, a location, a user, and a mode, and include information about a memory use type based on an application.

According to an embodiment of the present disclosure, the memory pattern estimator 105 may estimate an operation pattern of the application and estimate the memory use pattern, based on the operation pattern of the application and the working memory information of the application. In addition, the memory pattern estimator 105 may determine an average memory use of the application, based on the estimated memory use pattern.

For example, according to an embodiment of the present disclosure, the memory pattern estimator 105 may estimate the operation pattern of the application which is a pattern where a user uses a certain application, and may determine an amount of memory use which is averagely used when the user uses the certain application, based on the estimated operation pattern of the application.

Moreover, according to an embodiment of the present disclosure, the memory pattern estimator 105 may acquire time information and estimate a time-based memory use pattern, based on the time information and amount of memory use information.

Additionally, according to an embodiment of the present disclosure, the memory pattern estimator 105 may acquire location information and estimate a location-based memory use pattern, based on the location information and the amount of memory use information.

Moreover, according to an embodiment of the present disclosure, the memory pattern estimator 105 may acquire mode information and estimate a mode-based memory use pattern, based on the mode information and the amount of memory use information.

Additionally, according to an embodiment of the present disclosure, the memory pattern estimator 105 may acquire user information and estimate a user-based memory use pattern, based on the user information and the amount of memory use information.

According to an embodiment of the present disclosure, the memory controller 107 may secure a memory space, based on the memory use pattern estimated by the memory pattern estimator 105. For example, the memory controller 107 may control the memory of the device.

Moreover, according to an embodiment of the present disclosure, the memory controller 107 may secure a memory space, based on an average memory use of the application.

Additionally, according to an embodiment of the present disclosure, the memory controller 107 may secure a memory space, based on the time-based memory use pattern and secure a memory space, based on the location-based memory use pattern, a mode, and a user. This has been described above with reference to FIG. 3, and thus, a detailed description thereof is not provided.

Moreover, according to an embodiment of the present disclosure, based on information of another application cooperating with the application, the memory controller 107 may terminate other applications except the cooperated application according to a priority.

FIG. 4 is a diagram illustrating working memory information of an application according to an embodiment of the present disclosure.

According to an embodiment of the present disclosure, FIG. 4 illustrates a Table 40 showing working memory information of an application.

Referring to FIG. 4, according to an embodiment of the present disclosure, the Table 40 may include kind information 41 of the application, which is information for identifying the application. According to an embodiment of the present disclosure, the kind information 41 of the application may include an identifier of the application, a name of the application, a manufacturer of the application, and a data size of the application, but is not limited thereto.

According to an embodiment of the present disclosure, the Table 40 may include information 42 about a type of stored working memory information of an application. As described above with reference to FIGS. 1 to 3, a device may acquire information of another application cooperating with the application, in addition to an amount of memory used for an operation of the application, and thus, store the information of the other application cooperating with the application along with the working memory information of the application. Therefore, identification information for identifying information about an amount of memory used for the operation of the application or information about the other application cooperating with the application may be included in the Table 40 of FIG. 4.

According to an embodiment of the present disclosure, the Table 40 may include information about an operation 43 of an application. For example, the Table 40 may include information about an operation 43 performed by the application and information about an operation 43 request received by the application. For example, the information about the operation 43 of the application may include information about an operation 43 performed by the application by clicking a certain button.

According to an embodiment of the present disclosure, the Table 40 listing pieces of working memory information of an application may include the information about a history 44 of a working memory of the application. For example, the information about the history 44 of the working memory of the application may include an amount of memory, which is used according to an operation of the application, or information about another application cooperating with the application.

Referring to a first record 401 listed in the Table 40 of FIG. 4, a memory management apparatus of a device may determine that an operation in which an application 1 cooperates with an application 2 is performed according to a user input of clicking a camera button. In addition, referring to a second record 403 listed in the Table 40 of FIG. 4, the memory management apparatus may determine that the application 1 performs an operation using 400 MB according to a user input of clicking the camera button. In addition, referring to a third record 405 listed in the Table 40 of FIG. 4, the memory management apparatus may determine that the application 1 performs an operation using 450 MB according to a user input of clicking an album button.

For example, according to an embodiment of the present disclosure, the device may estimate or acquire at least one selected from the group consisting of information about an application operation pattern, application working memory information, and application cooperation information like information included in the Table 40 of FIG. 4.

Moreover, according to an embodiment of the present disclosure, working memory information of an application may be stored in the device or the cloud server in a form of the Table 40 shown in FIG. 4.

The Table 40 of FIG. 4 is merely an example of application working memory information and may include all types which include operation content of an application and information about an amount of memory use based on an operation of the application.

FIG. 5 is a flowchart illustrating a memory use pattern according to an embodiment of the present disclosure.

According to an embodiment of the present disclosure, FIG. 5 shows a Table 50 listing an amount of memory use.

Referring to FIG. 5, according to an embodiment of the present disclosure, the Table 50 may include reference information 51, which is information about a reference for distinguishing a memory use pattern. For example, a device may estimate a memory use pattern, based on at least one selected from the group consisting of a time, a location, a user, and a mode, and thus, the Table 50 may include the reference information 51, which is information indicating a reference for using records, for example, first to fifth records 501 to 504, included in the Table 50 when estimating a memory use pattern.

According to an embodiment of the present disclosure, the Table 50 may include content information 52 about detailed content of a time, a location, a user, and a mode. For example, the Table 50 may include information about a time, a location, a user, or a mode.

According to an embodiment of the present disclosure, the Table 50 may include information 53 about a used application.

According to an embodiment of the present disclosure, the Table 50 may include amount of memory use information 54 indicating an amount of memory which is used based on a corresponding time, location, user, or mode.

For example, according to an embodiment of the present disclosure, the device may acquire information about which application which user uses at which time, at which location, and in which mode or what amount of memory is used, like information included in the Table 50.

Referring to the first record 501 listed in the Table 50 of FIG. 5, a data management apparatus of the device may determine that an application 2 and an application 3 were used at 7:00 AM and an amount of memory use is 250 MB. Referring to the second record 502, the data management apparatus may determine that an application 4 was used at an A subway station and an amount of memory use is 400 MB. Referring to the third record 503, the data management apparatus may determine that an application 5 was used at 18:00 PM and an amount of memory use is 450 MB.

Moreover, according to an embodiment of the present disclosure, amount of memory use information of an application may be stored in the device or the cloud server in a type of the Table 50 shown in FIG. 5.

The Table 50 shown in FIG. 5 is merely an example of amount of memory use information and may be acquired and stored in various types for an amount of memory use.

Figure 6:
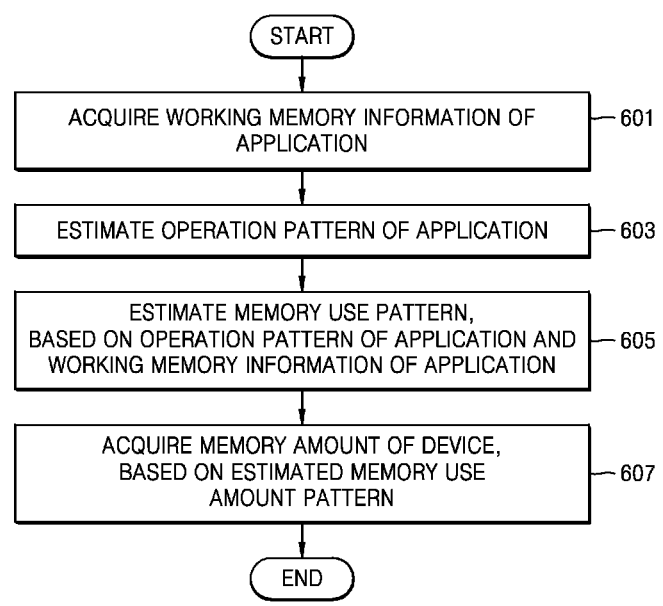
FIG. 6 is a flowchart illustrating a memory management method according to an embodiment of the present disclosure.

FIG. 6 is a flowchart illustrating a memory management method according to an embodiment of the present disclosure.

Referring to FIG. 6, in operation 601, a device may acquire working memory information of an application.

According to an embodiment of the present disclosure, the working memory information of the application may include information about an amount of memory used for an operation of the application. This has been described above with reference to FIGS. 1 to 5. Additionally, the working memory information of the application may include information of another application cooperating with the application.

For example, according to an embodiment of the present disclosure, the working memory information of the application may include information about an amount of memory use used for a first operation of the application.

In operation 603, the device may estimate an operation pattern of the application.

According to an embodiment of the present disclosure, the device may acquire information about an operation of the application, thereby estimating information about an operation which is performed by the application a certain number of times or more. According to an embodiment of the present disclosure, the device may acquire information about an operation which is performed by the application for a certain time or more, thereby estimating the operation pattern of the application. For example, the device may acquire information of operations which are performed by a messenger application (e.g., MSN, KakaoTalk, or the like) for a week, and estimate a pattern (e.g., chatting, photograph transmission, music sharing, or the like) in which the messenger application operates based on the acquired information of the operations performed by the messenger application.

Additionally, according to an embodiment of the present disclosure, the operation pattern of the application may be estimated based on the working memory information of the application. As described above with reference to FIG. 4, the working memory information of the application may include information about each operation of the application, and thus, the operation pattern of the application may be estimated based on the working memory information of the application.

In operation 605, the device may estimate a memory use pattern, based on the operation pattern of the application and the working memory information of the application. For example, according to an embodiment of the present disclosure, the device may estimate a memory use pattern of a user of the device, based on which application is used and an amount of memory use of a used application.

For example, when the user of the device uses a first application and a second application a certain number of times or more, the device may summate an amount of memory used for an operation of the first application, and an amount of memory used for an operation of the second application, thereby estimating a memory use pattern of the device. As described above with reference to FIGS. 1 to 5, the memory use pattern may be estimated based on at least one selected from the group consisting of a time, a mode, a user, and a location.

In operation 607, the device may secure a memory space, based on the estimated memory use pattern. This has been described above with reference to FIG. 2, and thus, a detailed description thereof is not provided.

Figure 7:
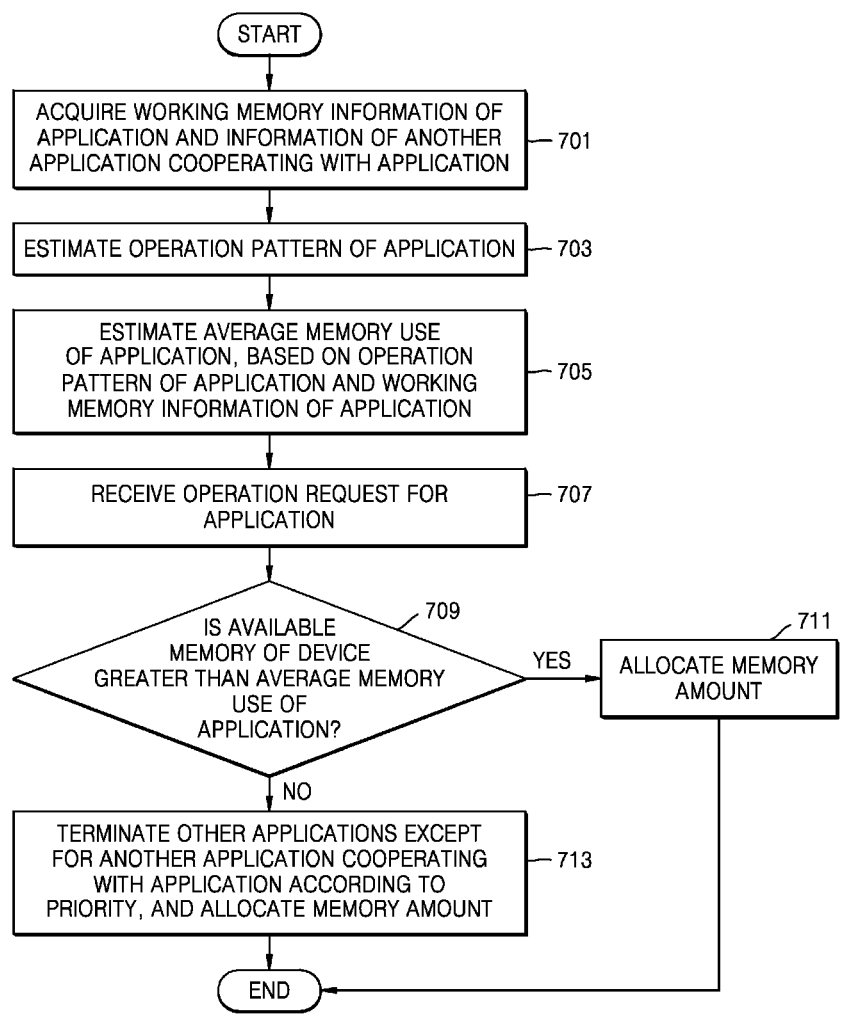
FIG. 7 is a flowchart illustrating a memory management method according to an embodiment of the present disclosure.

FIG. 7 is a flowchart illustrating a memory management method according to an embodiment of the present disclosure.

Referring to FIG. 7, in operation 701, a device may acquire working memory information of an application and information of another application cooperating with the application.

For example, according to an embodiment of the present disclosure, the device may recognize each operation which is performed by the application of the device, and acquire the working memory information of the application, which is information about an amount of memory used for each operation.

Moreover, when the application performs a certain operation, the device may acquire information about whether the application cooperates with another application and application cooperation information, which is information for identifying the other application cooperating with the application.

In operation 703, the device may estimate an operation pattern of the application.

According to an embodiment of the present disclosure, the working memory information of the application may include information about which operation the application performs. Therefore, the device may estimate a pattern of an operation performed by the application.

According to an embodiment of the present disclosure, the device may estimate an application operation pattern during a certain period, based on the working memory information and estimate the application operation pattern, based on an operation which is performed a certain number of times or more among a plurality of operations performed by the application.

In operation 705, the device may estimate an average memory use of the application, based on the operation pattern of the application and the working memory information of the application.

For example, a memory use pattern may include the average memory use of the application which is estimated in operation 705. A first application may perform first to fifth operations, but a user of the device may perform a first operation and a second operation by using the first application. Therefore, the device may acquire an operation pattern in which the user of the device performs the first and second operations by using the first application, and estimate the average memory use of the application based on working memory information, which is information about an amount of memory for the first and second operations.

Furthermore, the device may estimate a maximum use of memory used by the application.

In operation 707, the device may receive an operation request for the application. According to an embodiment of the present disclosure, an operation of the application may include execution. For example, the device may receive an execution request for the application.

In operation 709, the device may determine whether an available memory of the device is greater than the average memory use of the application.

For example, according to an embodiment of the present disclosure, the device may acquire information about an amount of memory use of the device and determine how much memory remains available, based on the amount of memory use information. In addition, the device may determine whether an available memory is greater than the average memory use of the application, which is estimated based on the operation pattern of the application.

In operation 711, if the amount of available memory is greater than the average memory use of the application, the device may allocate memory that is equal to the average memory use of the application. For example, the device may not terminate another application which is loaded in a memory of the device.

In operation 713, otherwise, if the amount of available memory is less than the average memory use of the application, the device may terminate other applications except another application cooperating with the application, based on a priority, and thus, secure an available memory and allocate memory that is equal to the average memory use of the application.

Figure 8:
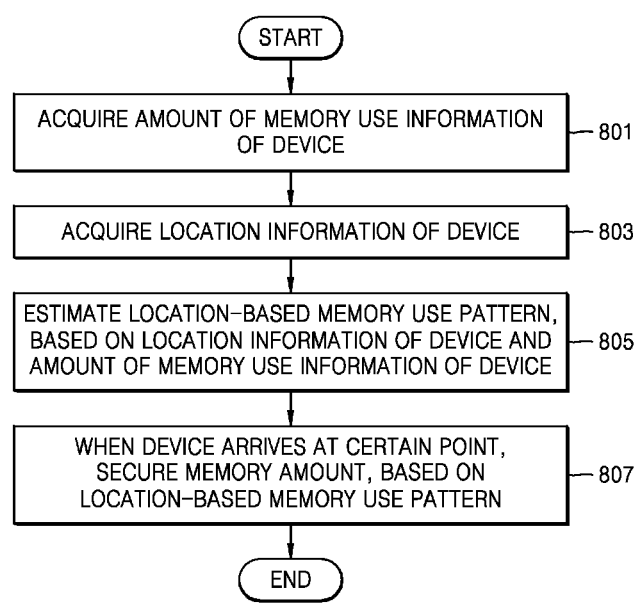
FIG. 8 is a flowchart illustrating a memory management method according to an embodiment of the present disclosure.

FIG. 8 is a flowchart illustrating a memory management method according to an embodiment of the present disclosure.

Referring to FIG. 8, in operation 801, a device may acquire amount of memory use information of the device. This has been described above with reference to FIG. 2, and thus, a detailed description thereof is not provided.

In operation 803, the device may acquire location information of the device. For example, the device may acquire location information, which is information about where the device is located, based on measurement information of a GPS sensor or information which the device receives from a network.

Additionally, according to an embodiment of the present disclosure, the device may acquire at least one selected from the group consisting of location information, time information, mode information, and user information of the device.

In operation 805, the device may estimate a location-based memory use pattern, based on the location information of the device and amount of memory use information of the device.

According to an embodiment of the present disclosure, an application used by a user of the device may be changed based on a location of the device. Thus, the device may estimate a use pattern of an application which operates in the device, based on a location and estimate a location-based memory use pattern which is information about an amount of memory which the device uses at a certain location, based on the use pattern of the application.

According to an embodiment of the present disclosure, an application used by the user of the device may be changed based on a time. Thus, the device may estimate a use pattern of an application which operates in the device, based on a time, and estimate a time-based memory use pattern, which is information about an amount of memory which the device uses at a certain time, based on the use pattern of the application.

Moreover, according to an embodiment of the present disclosure, an application used by the user of the device may be changed based on a user. Thus, the device may estimate a use pattern of an application which operates in the device, based on a user, and estimate a user-based memory use pattern, which is information about an amount of memory which the device uses based on a user, based on the use pattern of the application.

Additionally, according to an embodiment of the present disclosure, an application used by the user of the device may be changed based on a mode of the device. Thus, the device may estimate a use pattern of an application which operates in the device, based on a mode, and estimate a mode-based memory use pattern, which is information about an amount of memory which the device uses in a certain mode, based on the use pattern of the application.

In operation 807, when the device arrives at a certain point, the device may acquire an amount of memory space, based on the location-based memory use pattern.

According to an embodiment of the present disclosure, the device may estimate a location-based memory use amount pattern as in operation 805, and thus, when the device arrives at a certain point, the device may acquire an amount of memory space that is equal to an amount of memory use, which is estimated to be used at a location of the certain point.

Figure 9:
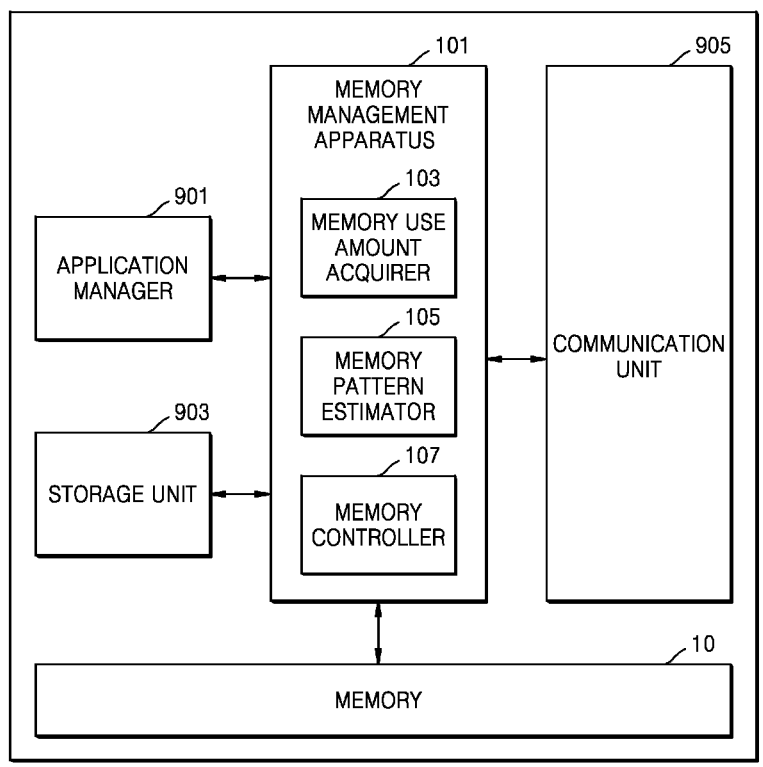
FIG. 9 is a block diagram illustrating a device including a memory management apparatus according to an embodiment of the present disclosure.

FIG. 9 is a block diagram illustrating a device including a memory management apparatus according to an embodiment of the present disclosure.

Referring to FIG. 9, a device 100 according to an embodiment of the present disclosure may include a memory management apparatus 101, a memory 10, an application manager 901, a storage unit 903, and a communication unit 905.

According to an embodiment of the present disclosure, the memory management apparatus 101 may include a memory use acquisition unit 103, a memory pattern estimator 105, and a memory controller 107. This has been described above with reference to FIG. 3, and thus, a detailed description thereof is not provided.

According to an embodiment of the present disclosure, the memory 10 may include RAM or flash memory included in a device. The memory 10 corresponds to details described above, and thus, its detailed description thereof is not provided.

According to an embodiment of the present disclosure, the application manager 901 may manage an operation of an application. For example, according to an embodiment of the present disclosure, the application manager 901 may receive an operation request for the application and allow the application to perform the operation.

Moreover, according to an embodiment of the present disclosure, when information associated with the operation of the application is stored in the storage unit 903, the application manager 901 may acquire, from the storage unit 903, the information associated with the operation of the application.

According to an embodiment of the present disclosure, the storage unit 903 may store at least one selected from the group consisting of amount of memory use information, information about a memory use pattern, application working memory information, and information about an application operation pattern, which are acquired by the memory management apparatus 101.

Moreover, according to an embodiment of the present disclosure, the communication unit 905 may communicate with the cloud server and thus transmit or receive at least one selected from the group consisting of the amount of memory use information, the information about the memory use pattern, the application working memory information, and the information about the application operation pattern.

Moreover, according to an embodiment of the present disclosure, the device 100 may update at least one piece of information stored in the storage unit 903, based on information which is received from the cloud server through the communication unit 905.

Additionally, according to an embodiment of the present disclosure, the device 100 may include a controller (not shown). Generally, the controller may control an overall operation of the device 100. In addition, according to an embodiment of the present disclosure, the controller (not shown) may include an operational unit, such as a central processing unit (CPU), and may be included in another element. However, the present embodiment is not limited thereto.

Moreover, according to an embodiment of the present disclosure, the device 100 may further include a user input unit (not shown). The user input unit may receive a user input and include a keyboard, a mouse, a trackball, a touch pad, a touch screen, a touch pen, a microphone, and a camera. However, the present embodiment is not limited thereto. In addition, the device 100 may further include at least one sensor, such as a GPS sensor.

Figure 10:
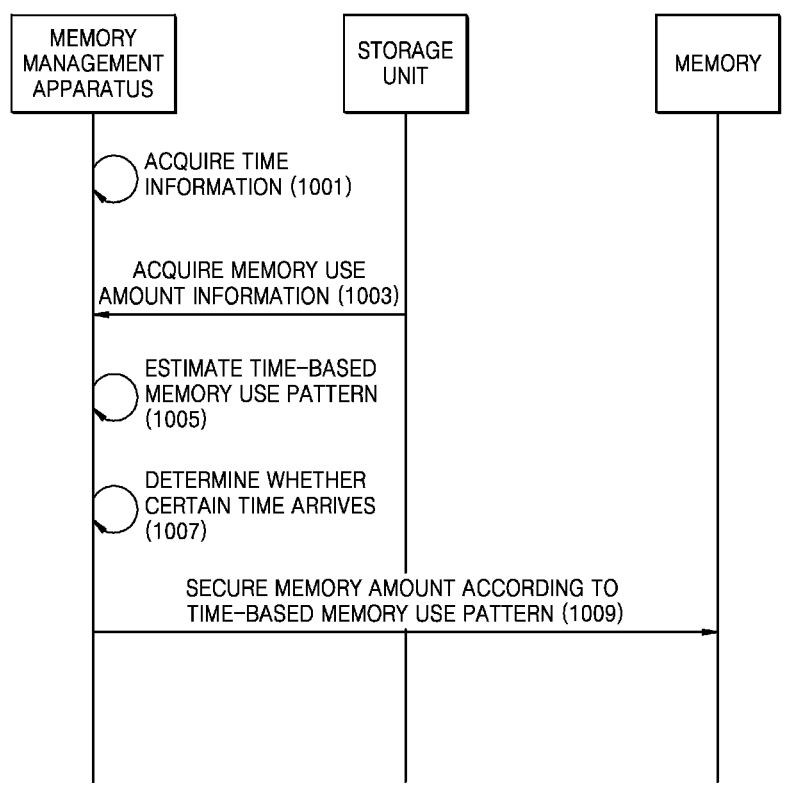
FIG. 10 is a flowchart illustrating a memory management method according to an embodiment of the present disclosure.

FIG. 10 is a flowchart illustrating a memory management method according to an embodiment of the present disclosure.

Referring to FIG. 10, in operation 1001, the memory management apparatus 101 may acquire time information.

Additionally, according to an embodiment of the present disclosure, the memory management apparatus 101 may acquire at least one selected from the group consisting of mode information, location information, and user information.

In operation 1003, the memory management apparatus 101 may acquire amount of memory use information from a storage unit. According to an embodiment of the present disclosure, the memory management apparatus 101 may determine an amount of memory use of a memory and acquire amount of memory use information.

For example, according to an embodiment of the present disclosure, the memory management apparatus 101 may acquire, from the memory or the storage unit, information about how much the memory is used at a certain time.

In operation 1005, the memory management apparatus 101 may estimate a time-based memory use pattern.

According to an embodiment of the present disclosure, the memory management apparatus 101 may estimate a time-based memory use amount pattern of a device, based on information about how much the memory is used at a certain time. For example, the memory management apparatus 101 may determine a type of using the memory with time.

Additionally, according to an embodiment of the present disclosure, the memory management apparatus 101 may acquire information about how much the memory is used in a certain mode and acquire information about how much the memory is used depending on a certain user or a certain location.

In operation 1007, according to an embodiment of the present disclosure, the memory management apparatus 101 may estimate a type in which the device uses the memory, based on application use information, which is information about which application is used depending on a time, a mode, a user, and a location.

In operation 1009, the memory management apparatus 101 may acquire an amount of memory according to the time-based memory use pattern. For example, according to an embodiment of the present disclosure, the memory management apparatus 101 may control the memory, and thus, when a certain time arrives even before a user of the device requests an operation of an application, the memory management apparatus 101 may control the memory to secure a memory space which is estimated as there being a high possibility of use.

Figure 11:
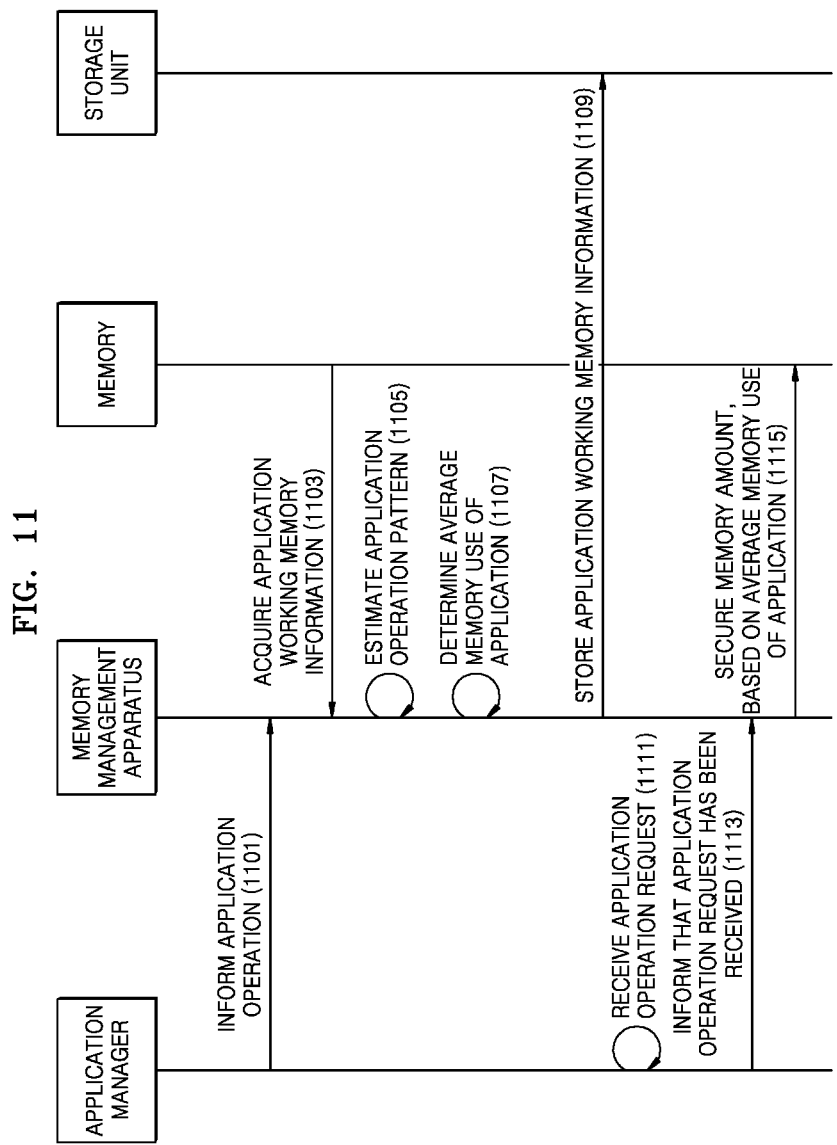
FIG. 11 is a flowchart illustrating a memory management method according to an embodiment of the present disclosure.

FIG. 11 is a flowchart illustrating a memory management method according to an embodiment of the present disclosure.

Referring to FIG. 11, in operation 1101, the application manager 901 may inform a memory management apparatus of each operation of an application. According to an embodiment of the present disclosure, the application manager 901 may manage the application included in a device. Therefore, when the application performs an operation, the application manager 901 may inform the memory management apparatus that the application performs the operation.

In operation 1103, the memory management apparatus 101 may acquire application working memory information from the storage unit 903. According to an embodiment of the present disclosure, the memory management apparatus 101 may acquire information of an amount of memory, used for each operation of the application, from the storage unit 903.

Additionally, according to an embodiment of the present disclosure, the memory management apparatus 101 may determine an amount of memory use of the memory of the device and acquire working memory information of the application, based on the determination of the amount of memory use.

In operation 1105, the memory management apparatus 101 may estimate an operation pattern of the application. For example, the memory management apparatus 101 may receive, from the application manager 901, notification about which operation the application performs, and thus estimate an operation pattern of the application about which operation the application mainly performs.

In operation 1107, the memory management apparatus 101 may determine an average memory use of the application. According to an embodiment of the present disclosure, the average memory use of the application may denote an amount of memory which is used when the application operates according to the estimated operation pattern of the application.

In operation 1109, the memory management apparatus 101 may store working memory information of the application in the storage unit 903. In addition, according to an embodiment of the present disclosure, the memory management apparatus 101 may store at least one selected from the group consisting of the operation pattern of the application and the average memory use of the application.

In operation 1111, the application manager 901 may receive an operation request for the application.

In operation 1113, the application manager 901 may inform the memory management apparatus 101 that the operation request has been received.

In operation 1115, the memory management apparatus 101 may acquire a memory space, based on the average memory use of the application.

For example, according to an embodiment of the present disclosure, the memory management apparatus 101 may determine an amount of memory use to determine available memory and compare the available memory with the average memory use of the application. The memory management apparatus 101 may terminate the application loaded in the memory, based on the comparison result, and thus, secure a memory space.

Figure 12:
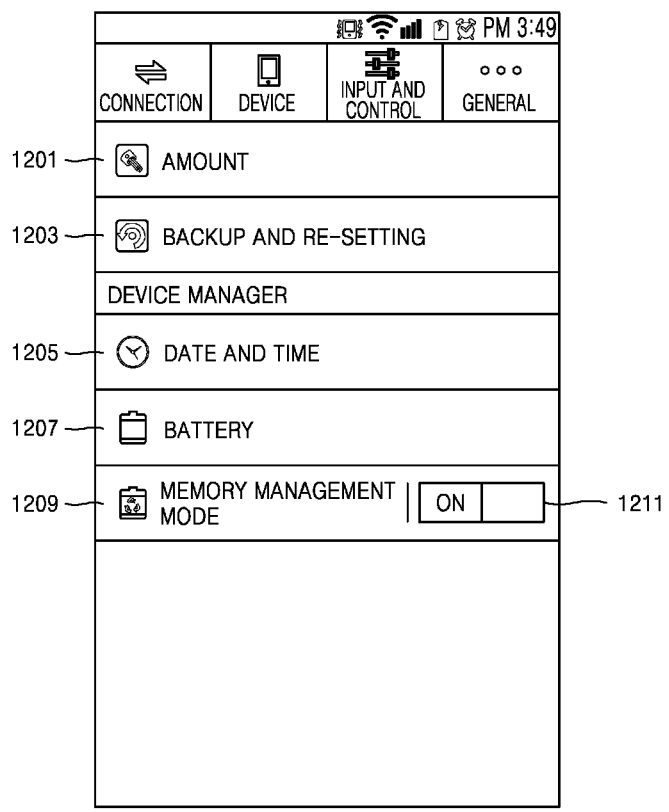
FIG. 12 is a diagram illustrating a method of setting a memory management mode according to an embodiment of the present disclosure.

FIG. 12 is a diagram illustrating a method of setting a memory management mode according to an embodiment of the present disclosure. FIG. 12 illustrates a screen on which items for setting an operating environment of a device are displayed.

Referring to FIG. 12, an account item 1201 may provide pieces of information for controlling setting of an account of a user using the device. For example, the user may select the account item 1201 and thus perform account management, namely, change the account of the user using the device or add an account of the user.

According to an embodiment of the present disclosure, a backup and re-setting item 1203 may provide various pieces of information for controlling the backup and setting of data, stored in the device, such as the backup and initialization of the device.

According to an embodiment of the present disclosure, a date and time management item 1205 may denote an item that provides control information associated with a time and a date of the device.

According to an embodiment of the present disclosure, a battery item 1207 may denote an item that provides the user with various pieces of information, such as a battery use of the device, a sleep mode, and display of a battery capacity, for controlling power of the device.

According to an embodiment of the present disclosure, a memory management mode item 1209 may denote an item in which setting is performed in order for a memory management mode of the device to be used or not to be used. As described above with reference to FIGS. 1 to 11, the present embodiment relates to a method of managing a memory of a device, and the device may secure an amount of memory of the device, based on a time, a location, a mode, a user, and an application.

Depending on the case, a user of a device may desire to perform setting of the device so as not to use a mode using the memory management method according to an embodiment of the present disclosure. Thus, the device may receive a user input which laterally moves an on/off button 1211 displayed on the right of the memory management mode item 1209, and thus, setting is performed in order for the device to use or not to use a memory management mode.

Figure 13:
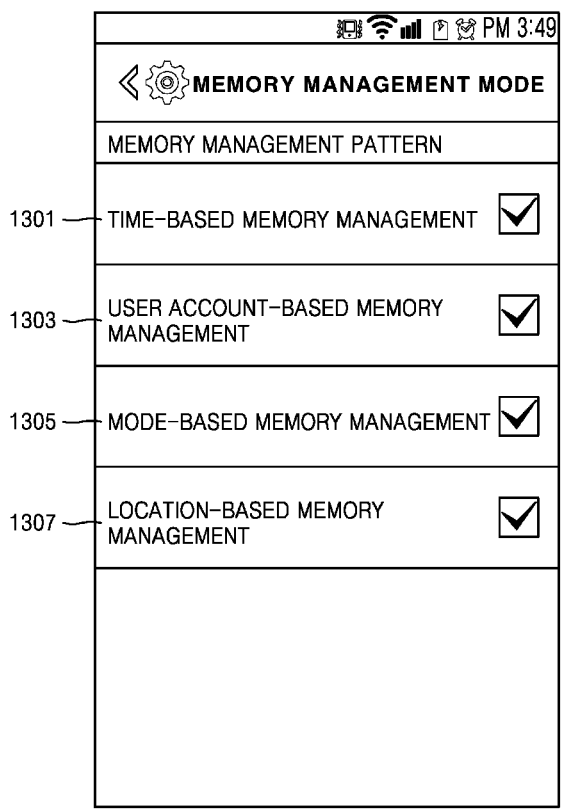
FIG. 13 is a diagram illustrating a method of setting an information-based memory management mode according to an embodiment of the present disclosure.

FIG. 13 is a diagram illustrating a method of setting an information-based memory management mode according to an embodiment of the present disclosure.

According to an embodiment of the present disclosure, FIG. 13 may be a screen which displays an item which is shown when the memory management mode item 1209 is selected.

As described above with reference to FIGS. 1 to 11, according to an embodiment of the present disclosure, memory management may be performed based on various pieces of information, and particularly, may be performed based on time information, user information, device mode information, and location information of a device.

Referring to FIG. 13, according to an embodiment of the present disclosure, a time-based memory management item 1301 may be an item via which the device acquires time information, estimates a time-based memory use pattern of the device, and sets whether to manage a memory of the device.

According to an embodiment of the present disclosure, a user account-based memory management item 1303 may be an item via which the device acquires user account information, estimates a user-based memory use pattern of the device, and sets whether to manage the memory of the device.

According to an embodiment of the present disclosure, a mode-based memory management item 1305 may be an item via which the device acquires information about a mode of the device, estimates a mode-based memory use pattern of the device, and sets whether to manage the memory of the device.

According to an embodiment of the present disclosure, a location-based memory management item 1307 may be an item via which the device acquires user account information, estimates a location-based memory use pattern of the device, and sets whether to manage the memory of the device.

According to an embodiment of the present disclosure, the device may receive a user input which selects or releases each of the memory management items 1301 to 1307, and thus, sets whether the device estimates a memory use pattern according to information to manage the memory. According to an embodiment of the present disclosure, the device may estimate a memory use pattern by taking into account all or at least one selected from the group consisting of time information, location information, mode information, and user account information.

As described above, according to the various embodiments of the present disclosure, by providing the method and apparatus for managing a memory of a device, a time consumed by a user of a device is reduced and an operation of a device, which is not intended by the user, is prevented from being performed.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a ROM, a RAM, Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

All the documents including the public laid open documents, patent applications, patent documents, and the like cited in the present disclosure may be merged into the present disclosure in the same manner as that indicated by individually or specifically merging the respective cited documents or as that indicated by merging them overall in the present disclosure.

To aid in understanding the present disclosure, reference numerals are used in the various embodiments of the present disclosure shown in the drawings, and specific terms are used to explain the various embodiments of the present disclosure. However, they are not intended to limit the present disclosure and may represent all the components that could be considered by those of ordinary skill in the art.

The present disclosure may be embodied as functional blocks and various processing operations. The functional blocks may be implemented with various hardware and/or software configurations executing specific functions. For example, the present disclosure employs integrated circuit configurations, such as a memory, processing, logic, a look-up table, and the like, capable of executing various functions upon control of microprocessors or other control devices. In a similar manner to that in which the elements of the present disclosure may be executed with software programming or software elements, the present disclosure may be implemented with a scripting language or a programming language, such as C, C++, Java, assembler, and the like, including various algorithms implemented by a combination of data structures, processes, routines, or other programming configurations. The functional aspects may be implemented by algorithms executed in one or more processors. In addition, the present disclosure may employ conversional arts to establish an electronic environment, process signals and/or process data. The terms "mechanism", "element", "means", and "configuration" may be widely used and are not limited to mechanical and physical configurations. Such terms may have the meaning of a series of routines of software in association with a processor or the like.

Specific executions described herein are merely examples and do not limit the scope of the present disclosure in any way. For simplicity of description, other functional aspects of electronic configurations according to the related art, control systems, software, and the systems may be omitted. Furthermore, line connections or connection members between elements depicted in the drawings represent functional connections and/or physical or circuit connections by way of example, and in actual applications, they may be replaced or embodied as various additional functional connections, physical connections, or circuit connections. In addition, the described elements may not be inevitably required elements for the application of the present disclosure unless they are specifically mentioned as being "essential" or "critical."

The singular forms "a," "an" and "the" in this present disclosure, in particular, the claims, may be intended to include the plural forms as well. Unless otherwise defined, the ranges defined herein are intended to include any disclosure to which values within the range are individually applied and may be considered to be the same as individual values constituting the range in the detailed description of the present disclosure. Finally, operations constituting the method of the present disclosure may be performed in appropriate order unless explicitly described in terms of order or described to the contrary. The present disclosure is not necessarily limited to the order of operations given in the description. The examples or terms (e.g., and the like) used herein are to merely describe the present disclosure and not intended to limit the present disclosure unless defined by the following claims. In addition, those of ordinary skill in the art will readily appreciate that many alternation, combination and modifications, may be made according to design conditions and factors within the scope of the appended claims and their equivalents.

It should be understood that the various embodiments of the present disclosure described therein should be considered in a descriptive sense only and not for purposes of limitation. Descriptions of features or aspects within each embodiment of the present disclosure should typically be considered as available for other similar features or aspects in other embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of managing a memory of a device, the method comprising:
   acquiring amount of memory use information from the memory of the device;
   estimating a memory use pattern, based on the acquired amount of memory use information; and
   acquiring a memory space, based on the estimated memory use pattern,
   wherein the acquiring of the amount of memory use information comprises receiving the amount of memory use information of the device from a cloud server.

2. The method of claim 1, wherein the estimating of the memory use pattern further comprises:
   determining an average memory use of the application, based on the estimated memory use pattern.

3. The method of claim 2, wherein the acquiring of the memory space comprises:
   receiving an operation request for the application; and
   acquiring the memory space, based on the average memory use of the application.

4. The method of claim 1, wherein the estimating of the memory use pattern further comprises:
   acquiring time information; and
   estimating a time-based memory use pattern, based on the time information and the acquired amount of memory use information.

5. The method of claim 4, wherein the acquiring of the memory space comprises, when a certain time arrives, acquiring the memory space, based on the time-based memory use pattern.

6. The method of claim 1, wherein the estimating of the memory use pattern further comprises:
   acquiring location information; and
   estimating a location-based memory use pattern, based on the location information and the acquired amount of memory use information.

7. The method of claim 6, wherein the acquiring of the memory space comprises, when the device arrives at a certain point, acquiring the memory space, based on the location-based memory use pattern.

8. The method of claim 1, wherein the estimating of the memory use pattern further comprises:
   acquiring mode information of the device; and
   estimating a mode-based memory use pattern, based on the mode information and the acquired amount of memory use information.

9. The method of claim 8, wherein the acquiring of the memory space comprises, when the device is switched to a certain mode, acquiring the memory space based on the mode-based memory use pattern.

10. The method of claim 1, wherein the estimating of the memory use pattern further comprises:
    acquiring user information of the device; and
    estimating a user-based memory use pattern, based on the user information and the acquired amount of memory use information.

11. The method of claim 10, wherein the acquiring of the memory space comprises, when a user of the device changes, acquiring the memory space, based on the user-based memory use pattern.

12. The method of claim 1, further comprising storing the amount of memory use information of the device.

13. The method of claim 1, further comprising transmitting, to a cloud server, at least one of information about the memory use pattern or the amount of memory use information of the device.

14. The method of claim 1, wherein the estimating of the memory use pattern comprises:
    estimating operation pattern of an application which operates in the device; and
    estimating the memory use pattern based on the operation pattern of the application and a working memory information of the application.

15. The method of claim 14, wherein the acquiring of the working memory information comprises acquiring information of another application cooperating with the application.

16. The method of claim 15, wherein the acquiring of the memory space comprises:
    receiving an operation request for the application; and
    terminating other applications except the cooperated application according to a priority, based on the information of the other application cooperating with the application.

17. A non-transitory computer-readable storage medium storing a computer program for executing the method of claim 1.

18. A device comprising a memory management apparatus, the memory management apparatus comprising:
- a communication interface;
- a memory; and
- a processor configured to:
  - acquire amount of memory use information from the memory of the device,
  - estimate a memory use pattern, based on the acquired amount of memory use information,
  - acquire a memory space, based on the estimated memory use pattern, and
  - receive the amount of memory use information of the device from a cloud server through the communication interface.

19. The device of claim 18, wherein the processor is further configured to:
- determine an average memory use of the application, based on the estimated memory use pattern.

20. The device of claim 19, wherein the processor is further configured to:
- receive an operation request for the application, and
- acquire the memory space based on the average memory use of the application.

21. The device of claim 18, wherein the processor is further configured to acquire time information and estimate a time-based memory use pattern, based on the time information and the acquired amount of memory use information.

22. The device of claim 21, wherein, when a certain time arrives, the processor is further configured to acquire the memory space, based on the time-based memory use pattern.

23. The device of claim 18, wherein the processor is further configured to acquire location information and estimate a location-based memory use pattern, based on the location information and the acquired amount of memory use information.

24. The device of claim 23, wherein, when the device arrives at a certain point, the processor is further configured to acquire the memory space, based on the location-based memory use pattern.

25. The device of claim 18, wherein the processor is further configured to acquire mode information of the device and estimate a mode-based memory use pattern, based on the mode information and the acquired amount of memory use information.

26. The device of claim 25, wherein, when the device is switched to a certain mode, the processor is further configured to acquire the memory space, based on the mode-based memory use pattern.

27. The device of claim 18, wherein the processor is further configured to acquire user information of the device and estimate a user-based memory use pattern, based on the user information and the acquired amount of memory use information.

28. The device of claim 27, wherein, when a user of the device changes, the processor is further configured to acquire the memory space, based on the user-based memory use pattern.

29. The device of claim 18, wherein the memory is further configured to store the amount of memory use information of the device.

30. The device of claim 18, further comprising a communication interface configured to transmit, to a cloud server, at least one of information about the memory use pattern or the amount of memory use information of the device.

31. The device of claim 18,
wherein the processor is further configured to estimate an operation pattern of an application which operates in the device, and estimate the memory use pattern based on the operation pattern of the application and a working memory information of the application.

32. The device of claim 18, wherein the processor is further configured to acquire information of another application cooperating with the application.

33. The device of claim 32, wherein the processor is further configured to:
- receive an operation request for the application, and
- terminate other applications except for the cooperated application according to a priority, based on the information of the other application cooperating with the application.

* * * * *